(12) United States Patent
Tomioka

(10) Patent No.: US 8,217,979 B2
(45) Date of Patent: Jul. 10, 2012

(54) OPTICAL SCANNER FOR IMAGE FORMING APPARATUS

(75) Inventor: Hiroyuki Tomioka, Osaka (JP)

(73) Assignee: Kyocera Mita Corporation (JP)

( * ) Notice: Subject to any disclaimer, the term of this patent is extended or adjusted under 35 U.S.C. 154(b) by 587 days.

(21) Appl. No.: 12/539,927

(22) Filed: Aug. 12, 2009

(65) Prior Publication Data

US 2010/0046046 A1 Feb. 25, 2010

(30) Foreign Application Priority Data

Aug. 20, 2008 (JP) .................................. 2008-211961

(51) Int. Cl.
 *B41J 15/14* (2006.01)
 *B41J 27/00* (2006.01)
(52) U.S. Cl. ........................................ 347/242; 347/257
(58) Field of Classification Search .................. 347/231, 347/241–246, 256–261
 See application file for complete search history.

(56) References Cited

U.S. PATENT DOCUMENTS

| 6,891,559 B1 * | 5/2005 | Bannai | 347/245 |
| 6,960,759 B2 * | 11/2005 | Konagaya | 250/238 |
| 7,242,505 B2 * | 7/2007 | Lee et al. | 359/216.1 |
| 7,256,813 B2 * | 8/2007 | Serizawa et al. | 347/245 |

FOREIGN PATENT DOCUMENTS

JP 2002-328321 11/2002

* cited by examiner

*Primary Examiner* — Hai C Pham
(74) *Attorney, Agent, or Firm* — Gerlad E. Hespos; Michael J. Porco

(57) ABSTRACT

An optical scanner for an image forming apparatus has a housing having a wall surface provided with a through-hole, and an optical scanning unit, which is provided within the housing, scans light on an object to be scanned in order to form an image on the object to be scanned, and includes: a polygon motor; a polygon mirror that reflects the light while being rotated by a driving force of the polygon motor; a mirror member that reflects the light reflected by the polygon mirror, toward a target object; and a mirror holding member that is attached to the wall surface of the housing and holds the mirror member. The mirror holding member has a heat radiation part that is exposed to the outside of the housing through the through-hole.

6 Claims, 11 Drawing Sheets

OPTICAL SCANNER FOR IMAGE FORMING APPARATUS

BACKGROUND OF THE INVENTION

1. Field of the Invention

The present invention relates to an optical scanner for an image forming apparatus.

2. Description of the Related Art

A conventional image forming apparatus, such as a printer, is provided with an optical scanner (LSU: laser scanner unit) for writing an electrostatic latent image (image) on a photosensitive drum (object to be scanned) (see Japanese Patent Application Publication No. 2002-328321).

Such an optical scanner has, in a housing thereof, a light source for emitting a laser beam, a polygon mirror for reflecting, while rotating, the laser beam emitted from the light source, a polygon motor for rotating and driving the polygon mirror, and an optical system having a lens or a mirror for guiding the laser beam reflected by the polygon mirror onto a photosensitive drum. The laser beam reflected by the polygon mirror is guided onto the photosensitive drum by the optical system and then scans the photosensitive drum in its axial direction. As a result, an image is written onto the photosensitive drum.

The optical scanner also has a base for controlling an image write start position on the photosensitive drum. A light receiving element is attached to this base. A part of the laser beam reflected by the polygon mirror is reflected by a light guide mirror (mirror member) and enters the light receiving element. As a result, an image write start signal is generated by the base, and the image write start position on the photosensitive drum is determined based on this signal.

Incidentally, the heat of the polygon motor rotating and driving the polygon mirror heats the housing of the optical scanner to relatively high temperature. Therefore, when a member holding the mirror is thermally deformed, the optical path of the reflected light moves, which might incapacitates the optical scanner.

For example, when a holding member holding the light guide mirror is thermally deformed and the optical path of the reflected light on the light guide mirror moves, the laser beam might not be able to enter the light receiving element of the base properly, which makes it difficult to appropriately control the image write start position on the photosensitive drum. As a result, so-called image deviation occurs where the position on the photosensitive drum where the image is written is deviated from the original position, whereby the image quality is reduced. Note that the light guide mirror is usually disposed in a place within the housing where the temperature is likely to be high.

SUMMARY OF THE INVENTION

An object of the present invention is to provide an optical scanner for an image forming apparatus, which is capable of preventing functional decline of the device by suppressing optical path deviation.

An optical scanner for an image forming apparatus according to one aspect of the present invention to achieve this object has: a housing having a wall surface provided with a through-hole; and an optical scanning unit, which is provided within the housing, scans light on an object to be scanned in order to form an image on the object to be scanned, and includes: a polygon motor; a polygon mirror that reflects the light while being rotated by a driving force of the polygon motor; a mirror member that reflects the light reflected by the polygon mirror, toward a target object; and a mirror holding member that is attached to the wall surface of the housing and holds the mirror member, wherein the mirror holding member has a heat radiation part that is exposed to the outside of the housing through the through-hole.

According to this configuration, because the mirror holding member for holding the mirror member has the heat radiation part that is exposed to the outside of the housing through the through-hole on the wall surface of the housing, even when the heat generated by the polygon motor raises the temperature of the inside of the housing, and thereby the temperature of the mirror holding member increases, the heat of the mirror holding member is released to the outside of the housing by the heat radiation part that is exposed to the outside of the housing. And, the outside of the housing has a lower temperature than the inside of the housing. Therefore, the excessive increase of the temperature of the mirror holding member is prevented.

Accordingly, it is possible to prevent thermal deformation of the mirror holding member caused by the increase in the temperature of the mirror holding member, as well as deviation of the position of the mirror member caused by the thermal deformation. Consequently, deviation of the optical path of the light reflected by the mirror member can be prevented. As a result, the reflected light can properly enter the target object, and thereby the optical scanner can be allowed to function normally.

DETAILED DESCRIPTION OF THE PREFERRED EMBODIMENTS

An embodiment of the present invention will be described hereinafter with reference to the drawings.

First, the entire configuration of a printer 100 according to an embodiment of the present invention is described with reference to FIG. 1.

Figure 1:
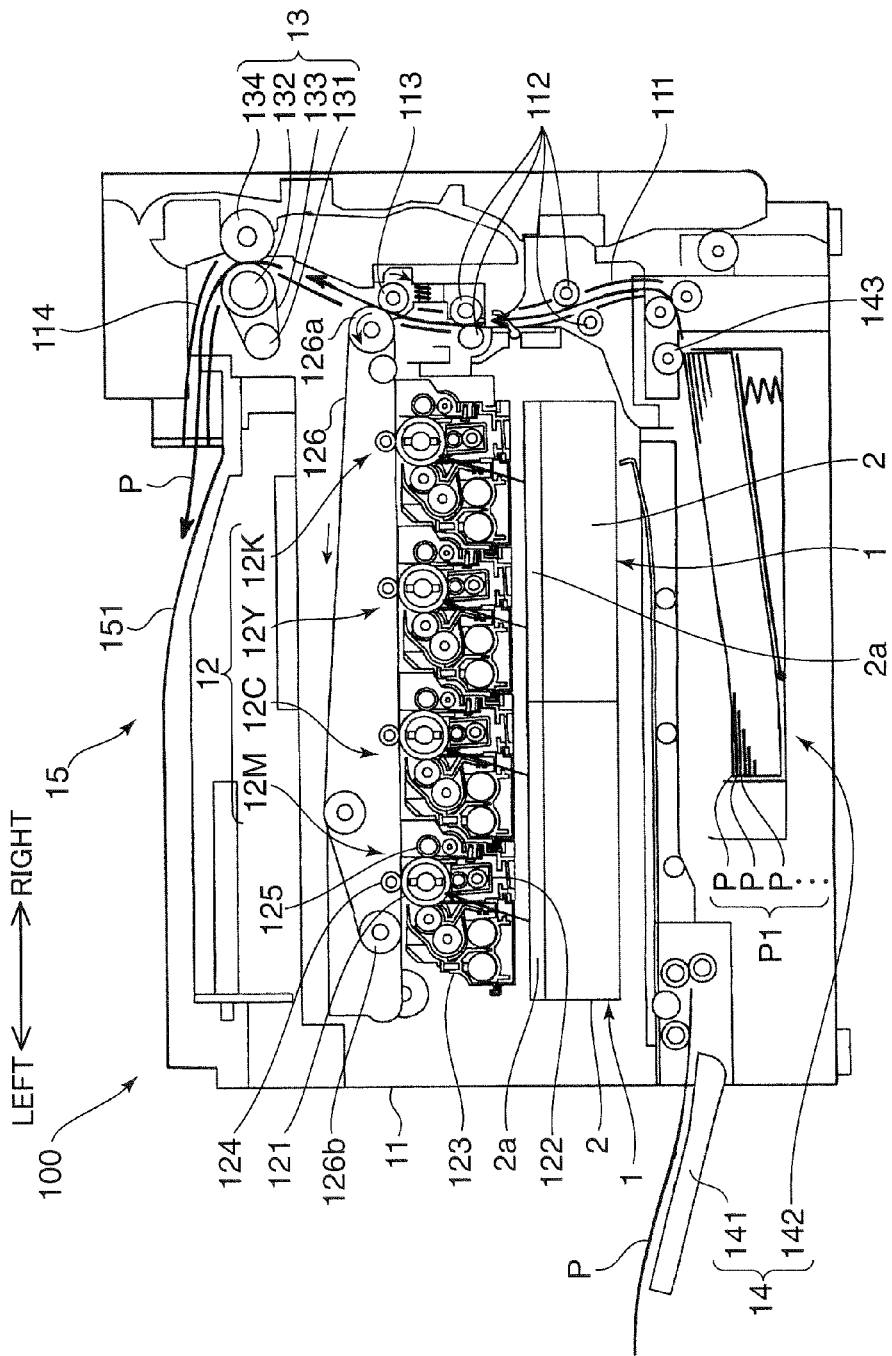
FIG. 1 is a front cross-sectional diagram showing the entire configuration of a printer according to an embodiment of the present invention.

As shown in FIG. 1, the inside of an apparatus main body 11 of the printer 100 of the present embodiment is provided with an image formation part 12 for forming an image and transferring the image onto a sheet P, a fixing part 13 for performing fixation processing on the image transferred onto the sheet P, and a sheet storage part 14 for storing the sheet P for image formation. The apparatus main body 11 is further provided with a sheet discharge part 15 for discharging the sheet P which the fixation process has been carried out to an upper part of the apparatus main body 11. The printer 100 is configured by these components described above.

The image formation part 12 forms a toner image on the sheet P supplied by the sheet storage part 14. In the present embodiment, a magenta unit 12M, a cyan unit 12C, a yellow unit 12Y and a black unit 12K are disposed from the upstream side (the left-hand side in FIG. 1) toward the downstream side (the right-hand side in FIG. 1), in this order.

In each of the units 12M, 12C, 12Y and 12K, a charger 122, a developing device 123, a primary transfer roller 124, and a cleaner 125 are disposed in a clockwise manner around a photosensitive drum 121 (an object to be scanned) from a position immediately below the photosensitive drum 121 in FIG. 1. Furthermore, an optical scanner (LSU: laser scanner unit) 1 is disposed below the charger 122. In this embodiment, two of the optical scanners 1 are disposed laterally adjacent to each other. The left-hand side optical scanner 1 corresponds to the magenta unit 12M and the cyan unit 12C, while the right-hand side optical scanner 1 corresponds to the yellow unit 12Y and the black unit 12K.

The peripheral surface of the photosensitive drum 121 is formed of an amorphous silicon layer so as to be able to form an electrostatic latent image and a toner image.

The charger 122 applies a uniform electric charge to the peripheral surface of the photosensitive drum 121 by means of corona discharge.

The optical scanners 1 emit a laser beam to the peripheral surface of the rotating photosensitive drum 121 and scan the photosensitive drum 121 in an axial direction to write an electrostatic latent image (image) onto the peripheral surface of the photosensitive drum 121 by eliminating the electric charge on the peripheral surface of the photosensitive drum 121. This optical scanner 1 has a box-shaped housing 2 having an opened upper surface, and a cover body 2a that covers the upper surface of the housing 2 and has, at an appropriate place therein, an opening for allowing the laser beam to pass therethrough. The optical scanners 1 will be described hereinafter in more detail.

The developing device 123 forms a toner image on the peripheral surface of the photosensitive drum 121 by supplying toners to a section on the peripheral surface where the electrostatic latent image is formed.

In an upper position of the photosensitive drum 121, a transfer belt 126 that is tightly stretched between a drive roller 126a and a driven roller 126b contacts the photosensitive drum 121. This transfer belt 126 revolves in synchronization with the each photosensitive drum 121 while pressed against the peripheral surface of the photosensitive drum 121 by the primary transfer roller 124 provided in accordance with each photosensitive drum 121.

Therefore, as the transfer belt 126 revolves, toner images obtained from the magenta unit 12M, cyan unit 12C, yellow unit 12Y and black unit 12K are sequentially transferred and overlapped on one position on the surface of the transfer belt 126. As a result, a color toner image is formed on the surface of the transfer belt 126. This color toner image formed on the surface of the transfer belt 126 is transferred onto the sheet P.

The cleaner 125 is for removing the toners remaining on the peripheral surface of the photosensitive drum 121 after the transfer processing, to clean the peripheral surface of the photosensitive drum 121. The peripheral surface of the photosensitive drum 121 that is cleaned by the cleaner 125 is again sent to the charger 122 for a subsequent image formation processing.

A sheet conveyance path 111 extending vertically is formed on the right-hand side position of the image formation part 12. This sheet conveyance path 111 is provide with a conveyance roller pair 112 in an appropriate place, and the sheet P is conveyed from the sheet storage part 14 toward the transfer belt 126 by driving the conveyance roller pair 112.

The sheet conveyance path 111 is also provided with a secondary transfer roller 113 that faces the drive roller 126a and contacts the surface of the transfer belt 126. The sheet P that is conveyed through the sheet conveyance path 111 is pressed and held between the transfer belt 126 and the secondary transfer roller 113, whereby the toner image on the transfer belt 126 is transferred to the sheet P.

The fixing part 13 has a heating roller 131 having an electric heat generating body therein, a fixing roller 132 disposed on the right-hand side of the heating roller 131, a fixing belt 133 stretched tightly between the heating roller 131 and the fixing roller 132, and a pressure roller 134 that is disposed facing the fixing roller 132 via the fixing belt 133.

The sheet P, which is allowed to pass through a nip part between the transfer belt 126 and the secondary transfer roller 113 and supplied to the fixing part 13 with the toner image of the transfer belt 126 transferred thereon, is applied with heat by the fixing belt 133 while passing through the pressure roller 134 and the fixing belt 133, and then subjected to the fixation processing.

The sheet P that is finished with the fixation processing passes through a sheet discharge conveyance path 114 extending from an upper part of the fixing part 13, and is then discharged toward a sheet discharge tray 151 of the sheet discharge part 15.

The sheet storage part 14 has a manual tray 141 provided in a side wall of the apparatus main body 11 so as to be openable and closable, and a sheet tray 142 that is mounted in a lower position of the optical scanner 1 within the apparatus main body 11 so as to be insertable and extractable into and from the lower position.

The manual tray 141 is provided for manually feeding the sheets P one at a time toward the image formation part 12.

The sheet tray 142 is configured to store a sheet stack P1 formed by stacking a plurality of the sheets P. The uppermost sheet P of the sheet stack P1 stored in the sheet tray 142 is fed out toward the sheet conveyance path 111 by driving a pickup roller 143. The fed out sheet P is sent toward the image formation part 12 through the sheet conveyance path 111 by driving the conveyance roller pair 112.

Next, the configurations of the substantial parts of the left-hand side optical scanner 1 shown in FIG. 1 are described with reference to FIGS. 1 to 3. Note that the configuration of the right-hand side optical scanner 1 is substantially identical to the configuration of the left-hand side optical scanner 1, and therefore a detailed description thereof has been omitted.

In the optical scanner 1, a nearly hermetically-sealed space is formed by attaching the cover body 2a to the housing 2 described above. As shown in FIG. 2, the optical scanner 1 has, in the housing 2 thereof, an optical scanning unit 7 for scanning light on the photosensitive drum 121 to form an image on the photosensitive drum 121. The optical scanner 7 has, at least, a polygon mirror 3, a polygon motor 31, reflecting mirrors (mirror members) 53 to 55, mirror holding members for holing the reflecting mirrors 53 to 55 respectively, a light guide mirror (mirror member) 56, and mirror holding members 7M and 7C for holding the light guide mirror 56.

Figure 8:
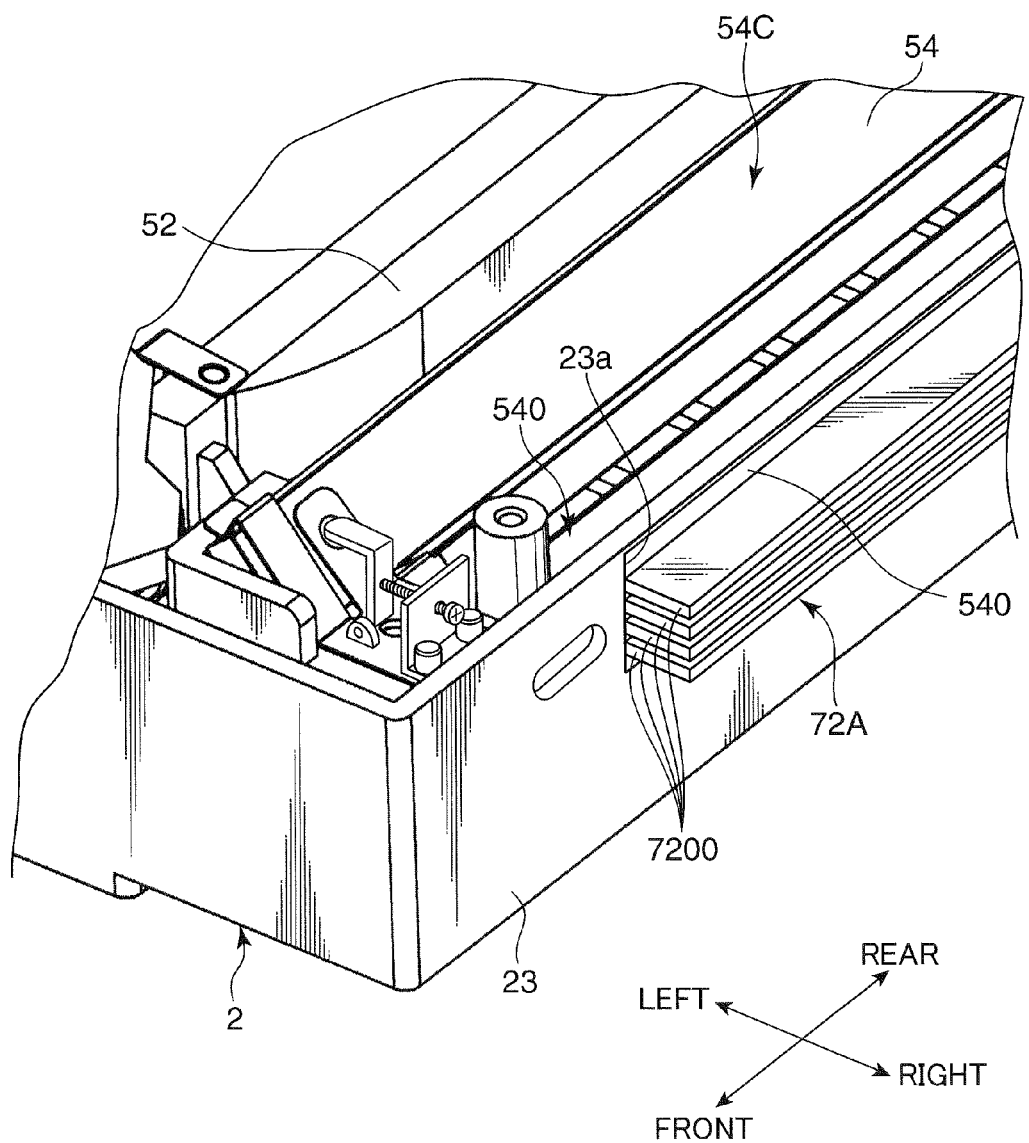
FIG. 8 is a perspective view showing a state in which the mirror holding member for holding a reflecting mirror is inserted into the through-hole provided in the right wall surface of the housing.
Figure 9:
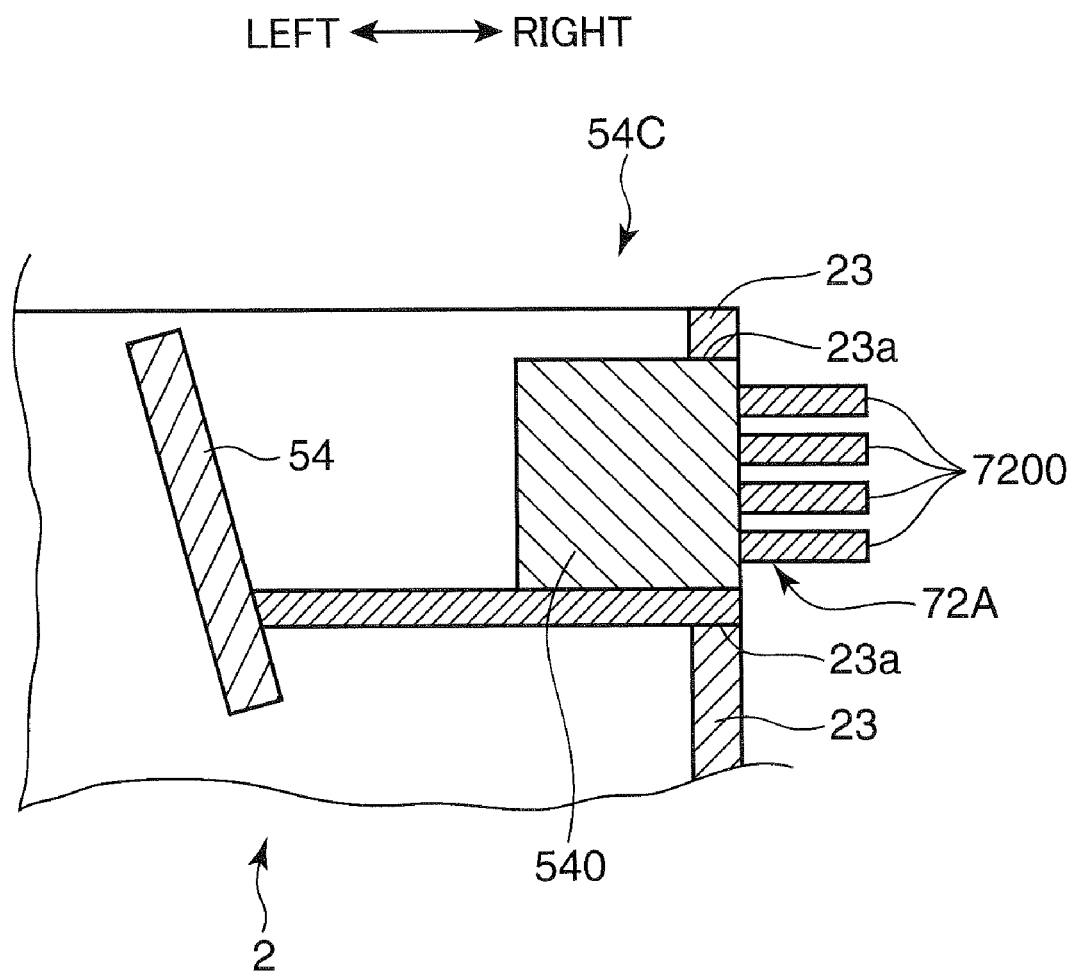
FIG. 9 is a cross-sectional diagram showing the state in which the mirror holding member for holding the reflecting mirror is inserted into the through-hole provided in the right wall surface of the housing.

In this embodiment, a mirror holding member 54C is illustrated as the mirror holding member for holding each of the reflecting mirrors 53 to 55 (see FIGS. 8 and 9).

Further, the optical scanner 1 has, in the housing 2 thereof, a light-emitting diode 4M and optical system 5M corresponding to the magenta unit 12M (see FIG. 1), and a light-emitting diode 4C and optical system 5C corresponding to the cyan unit 12C (see FIG. 1).

Figure 2:
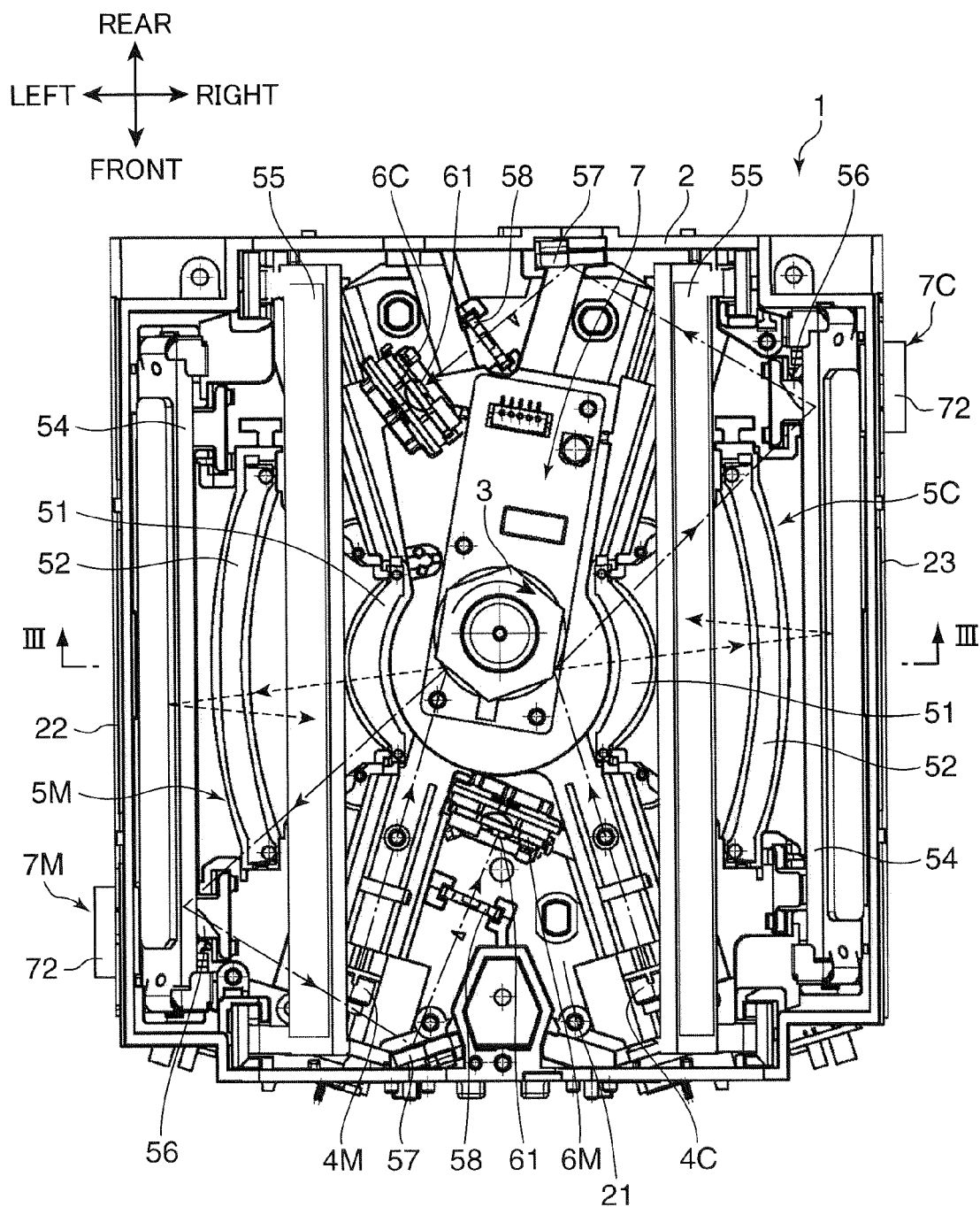
FIG. 2 is a plan view showing the internal configuration of an optical scanner of the printer.

As shown in FIG. 2, the polygon mirror 3 is provided in a middle position of the housing 2. This polygon mirror 3 is connected to a drive shaft 32 of the polygon motor 31 attached to an inner bottom surface 21 of the housing 2, as shown in FIG. 3. The polygon mirror 3 is configured to reflect a laser beam from each of the light-emitting diodes 4M, 4C while rotating in a clockwise direction in FIG. 2 by means of a driving force of the polygon motor 31.

As shown in FIG. 2, the light-emitting diode 4M is provided in a front left position of the polygon mirror 3 so as to face the polygon mirror 3. The light-emitting diode 4C is provided in a front right position of the polygon mirror 3 so as to face the polygon mirror 3, as shown in FIG. 2.

The optical system 5M is to guide the laser beam emitted from the light-emitting diode 4M and then reflected by the polygon mirror 3 to the peripheral surface of the photosensitive drum 121 of the corresponding magenta unit 12M, and is provided in a left-hand side position of the polygon mirror 3, as shown in FIG. 2. The optical system 5C is to guide the laser beam emitted from the light-emitting diode 4C and then reflected by the polygon mirror 3 to the peripheral surface of the photosensitive drum 121 of the corresponding cyan unit 12C, and is provided in a right-hand side position of the polygon mirror 3 as shown in FIG. 2.

Each of the optical systems 5M, 5C is configured by two fθ lenses 51, 52 and the three reflecting mirrors 53 to 55.

Figure 3:
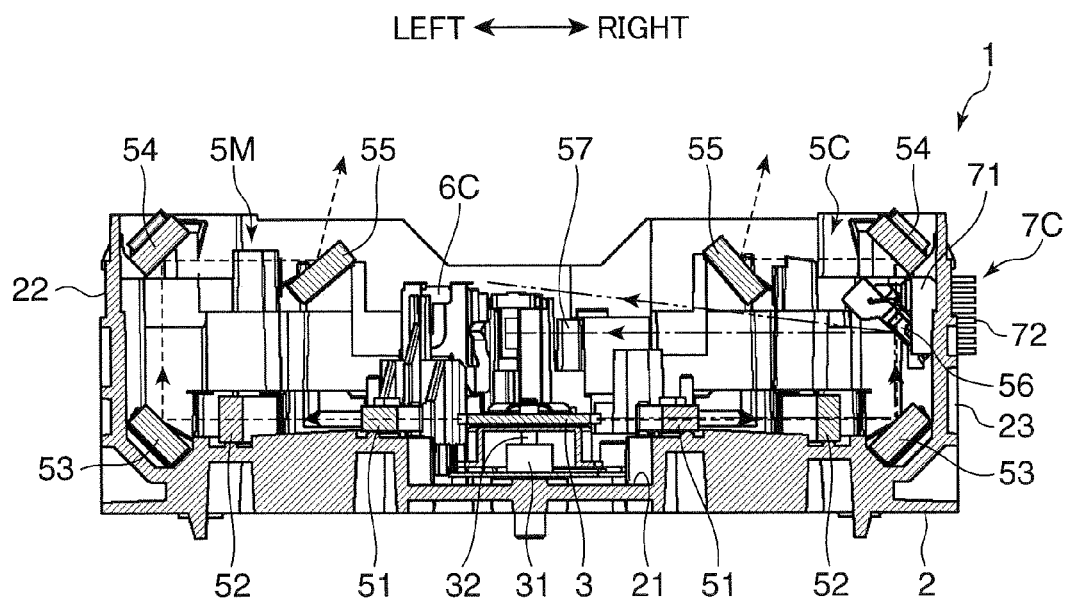
FIG. 3 is a cross-sectional diagram taken along the line III-III in FIG. 2.

The laser beam that is emitted from each light-emitting diode 4M, 4C toward the rear side in FIG. 2 and reflected by the polygon mirror 3 is allowed to pass through the pair of fθ lenses 51, 52 of each optical system 5M, 5C, then reflected by the three reflecting mirrors 53 to 55 of each optical system 5M, 5C sequentially, and guided to the peripheral surface of the photosensitive drum 121 of each unit 12M, 12C (see the dashed lines shown in FIGS. 2 and 3). As a result, an image is written onto the photosensitive drum 121 of each unit 12M, 12C.

Moreover, as shown in FIG. 2, the optical scanner 1 has bases 6M, 6C for controlling a position for starting to write an image onto the photosensitive drum 121 of each unit 12M, 12C, that is, an image write start position. The base 6M corresponds to the magenta unit 12M and is provided in front of the polygon mirror 3, as shown in FIG. 2. The base 6C corresponds to the cyan unit 12C and is provided behind the polygon mirror 3 as shown in FIG. 2.

Each of the bases 6M, 6C is provided with a light receiving element (target object) 61.

As shown in FIG. 2, the optical scanner 1 has the light guide mirror (mirror member) 56, a reflecting mirror 57, and, a lens 58. These are for guiding a part of the laser beam reflected by the polygon mirror 3 to each light receiving element 61.

The light guide mirror 56 is to reflect the laser beam that is reflected by the polygon mirror 3 and allowed to pass through the fθ lenses 51, 52, toward the reflecting mirror 57. As shown in FIG. 2, the light guide mirror 56 corresponding to magenta is provided in a front left position within the housing 2, while the light guide mirror 56 for cyan is provided in a front right position within the housing 2, as shown in FIG. 2.

The reflecting mirror 57 reflects the light from the light guide mirror 56 toward the lens 58.

The lens 58 allows the light reflected by the reflecting mirror 57 to pass and guides it to each light receiving element 61.

As shown in FIG. 2, the light guide mirrors 56 are held by the mirror holding members 7M and 7C, respectively, so that the light reflected by the light guide mirrors 56 properly enters the light receiving elements 61 through a predetermined optical path (for example, the optical path shown by the dashed line in FIG. 2).

The mirror holding member 7M is attached to a left wall surface 22 of the housing 2, as shown in FIG. 2, while the mirror holding member 7C is attached to a right wall surface 23 of the housing 2, as shown in FIG. 2.

The configuration of the mirror holding member 7C will be described hereinafter with reference to FIGS. 4 to 7. Note that the configuration of the mirror holding member 7M is substantially identical to the configuration of the mirror holding member 7C, and therefore a detailed description thereof has been omitted.

Figure 4:
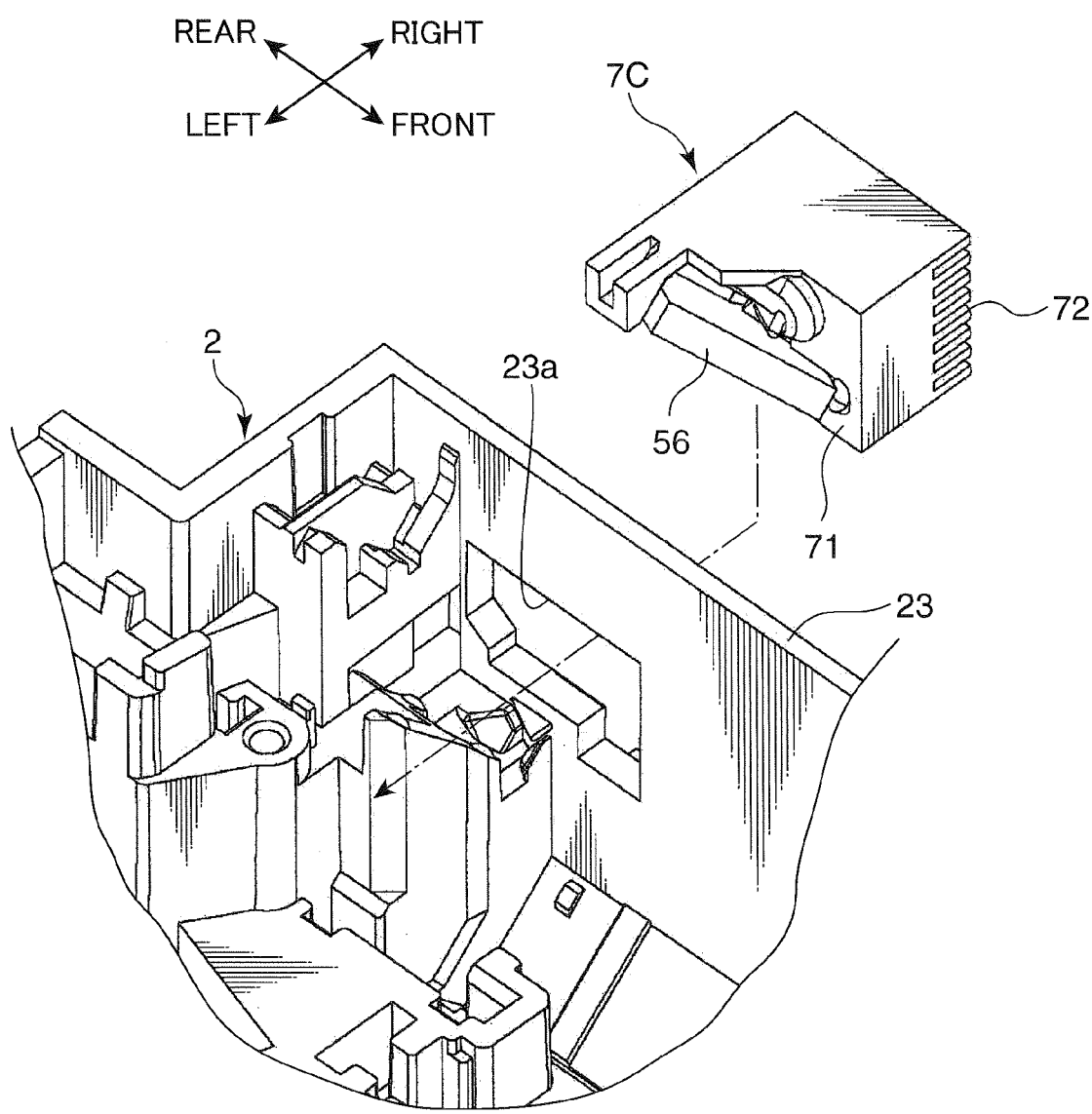
FIG. 4 is a perspective view showing a through-hole provided in a right wall surface of a housing of the optical scanner, and a mirror holding member (mirror holding member for holding a light guide mirror) that is inserted into the through-hole.

The mirror holding member 7C is made of, for example, a metallic material or a resin material, and has a holding part 71 for holding the light guide mirror 56 and a fin (heat radiation fin; heat radiation part) 72 provided consecutively with the holding part 71, as shown in FIG. 4.

In the optical scanner 1 of this embodiment, the right wall surface 23 of the housing 2 is provided with a through-hole 23a communicating the inside and outside of the housing 2, as shown in FIG. 4. The mirror holding member 7C is fitted into the through-hole 23a and thereby attached to the housing 2.

Figure 5:
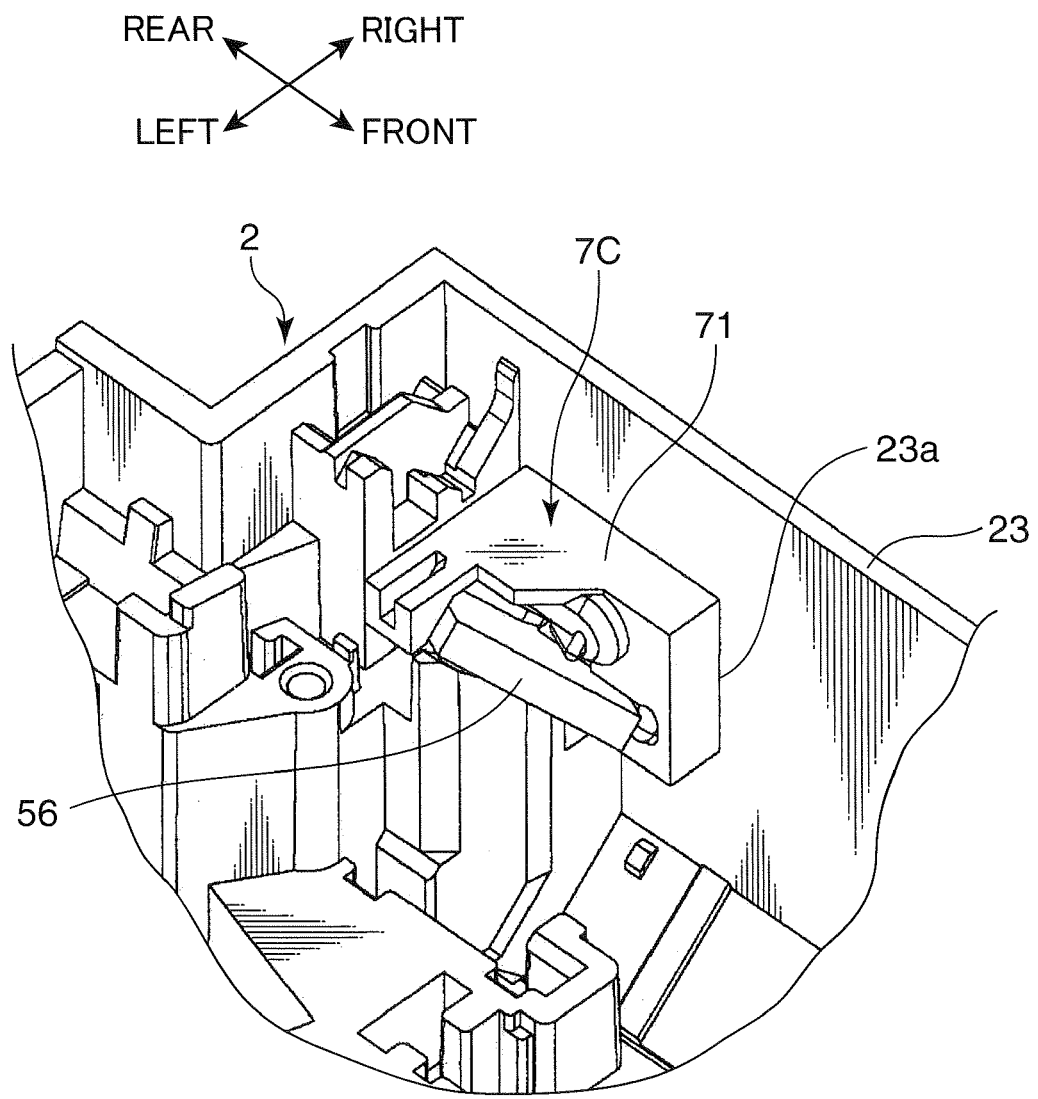
FIG. 5 is a perspective view showing a state in which the mirror holding member for holding the light guide mirror is inserted into the through-hole provided in the right wall surface of the housing.

As shown in FIG. 5, the holding part 71 is inserted into the through-hole 23a, while the light guide mirror 56 held by the holding part 71 is positioned within the housing 2.

Figure 6:
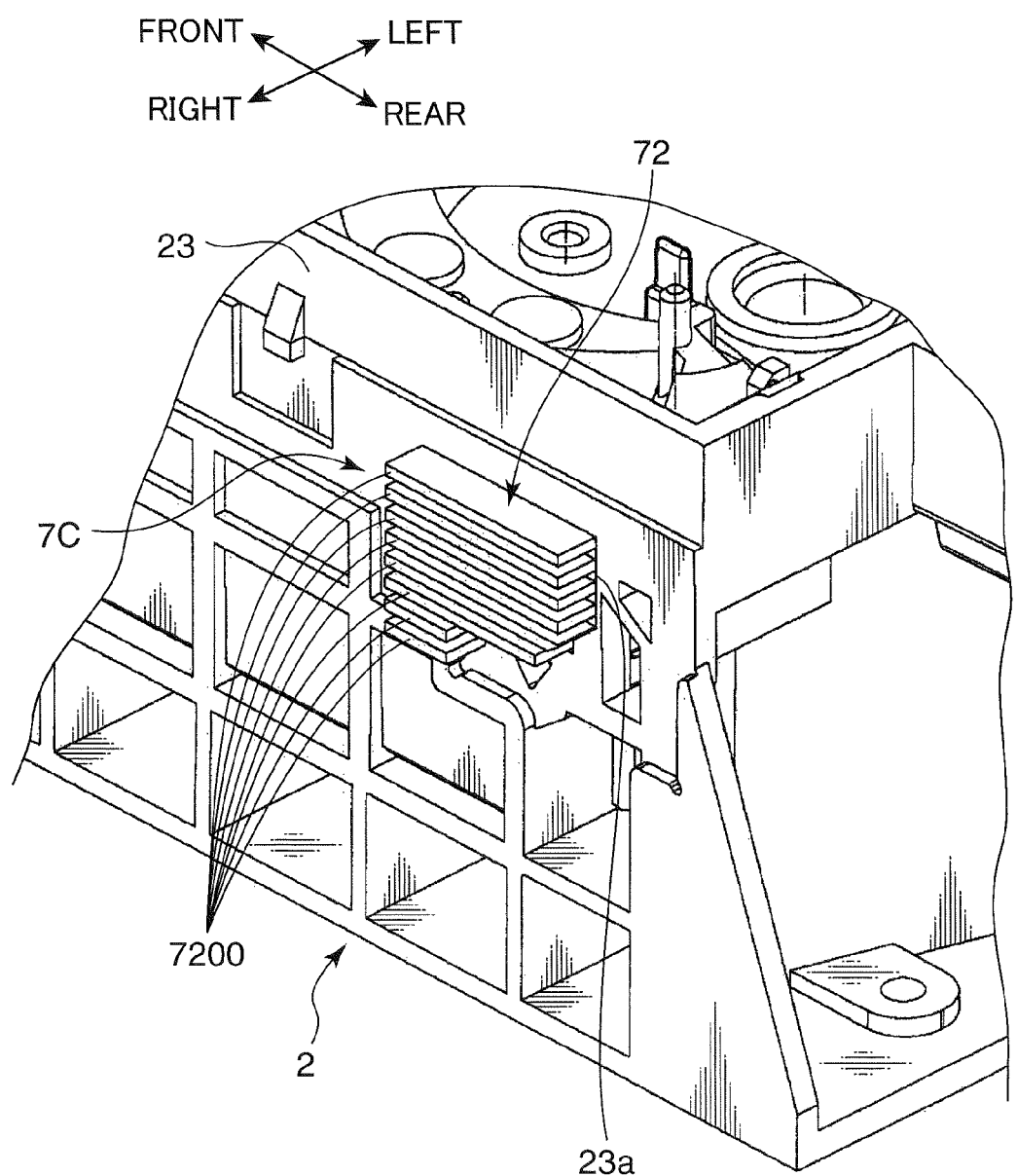
FIG. 6 is a perspective view where the state in which the mirror holding member for holding the light guide mirror is inserted into the through-hole provided in the right wall surface of the housing is viewed from a angle different from FIG. 5.
Figure 7:
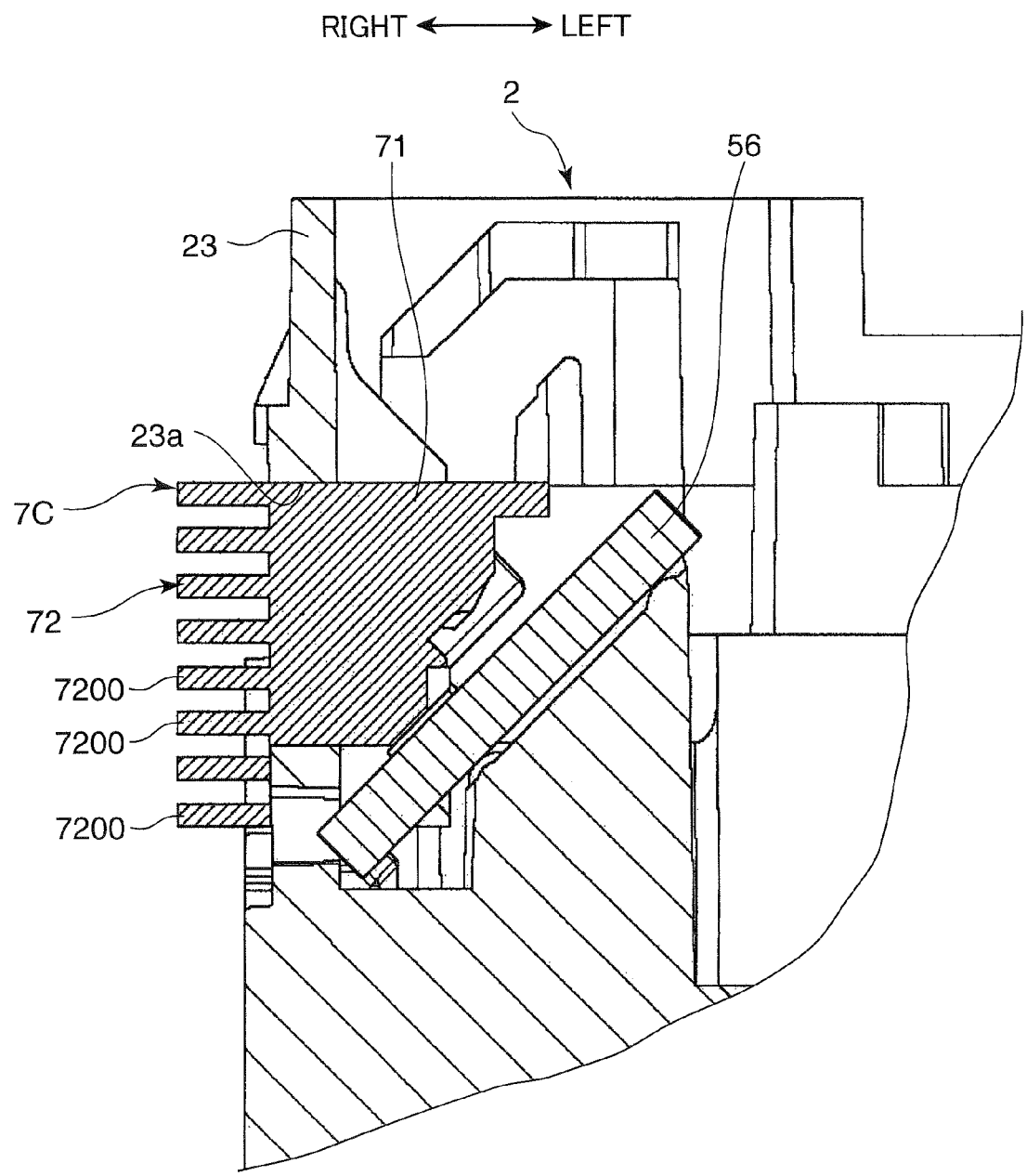
FIG. 7 is a cross-sectional diagram showing the state in which the mirror holding member for holding the light guide mirror is inserted into the through-hole provided in the right wall surface of the housing.

As shown in FIGS. 6 and 7, the fin 72 is configured by eight plate materials 7200 . . . that extend horizontally and are arranged vertically with a predetermined space therebetween. When the holding part 71 is inserted into the through-hole 23a, this fin 72 protrudes from the right wall surface 23 of the housing 2 to the right-hand side and is exposed to the outside of the housing 2, as shown in FIGS. 6 and 7.

A part of the laser beam that is emitted from each light-emitting diode 4M, 4C and reflected by the polygon mirror 3 is allowed to pass through the pair of fθ lenses 51, 52 of each optical system 5M, 5C and reflected by the reflecting mirror 53. Thereafter, the part of the laser beam is reflected by the light guide mirror 56 and the reflecting mirror 57 and enters the light receiving element 61 of each base 6M, 6C through the lens 58 (see the dashed lines shown in FIGS. 2 and 3). Consequently, an image write start signal is generated in each of base 6M, 6C, and the image write start position on the photosensitive drum 121 is determined based on this signal.

Incidentally, in the optical scanner 1, the temperature of the inside of the housing 2 is increased by the heat generated by driving the polygon motor 31. Furthermore, the temperature of the section where the mirror holding member 7C (7M) is installed increases comparatively easily in the housing 2. For this reason, when the temperature of the holding part 71 of the mirror holding member 7C (7M) increases excessively, the holding part 71 might be thermally deformed and the position of the light guide mirror 56 might be deviated, due to the increase in temperature of the mirror holding member 7C (7M).

In this embodiment, however, because the mirror holding member 7C (7M) is provided with the fin 72 exposed to the outside of the housing 2, the excessive increase of the temperature of the mirror holding member 7C (7M) is prevented by the air-cooling and heat radiation operation performed by the fin 72. Therefore, deviation of the position of the light guide mirror 56 and deviation of the optical path of the reflected light caused by the deviation of the position of the light guide mirror 56 are suppressed (see the two-dot chain line shown in FIG. 3).

According to the optical scanner 1 of this embodiment, even when the temperature of the inside of the housing 2 is increased (to approximately 45° C., for example) by the heat generated by the polygon motor 31 and thereby the temperature of the mirror holding member 7C holding the light guide mirror 56 is increased, the fin 72 that is exposed to the outside of the housing 2, the outside of the housing 2 is cooler than the inside of the housing 2, releases the heat of the mirror holding member 7C to the outside of the housing 2. As a result, the excessive increase of the temperature of the mirror holding member 7C can be prevented. Therefore, thermal deformation of the mirror holding member 7C caused by the increase in the temperature of the mirror holding member 7C, and deviation of the position of the light guide mirror 56 caused by the thermal deformation can be prevented, suppressing deviation of the optical path of the light reflected by the light guide mirror 56. Consequently, the reflected light can properly enter the light receiving element 61 of the base 6C, and thereby the optical scanner 1 can be allowed to function normally.

Moreover, according to the optical scanner 1 of this embodiment, the fin 72 protruding to the outside of the housing 2 is provided consecutively with the holding part 71 holding the light guide mirror 56. Therefore, the heat of the holding part 71 is transmitted to the fin 72 efficiently and emitted to the outside of the housing 2 by the fin 72. Consequently, thermal deformation of the holding part 71 and deviation of the position of the light guide mirror 56 can be prevented sufficiently. In addition, because the fin 72 has a larger surface area than a simple convex heat radiation part, the radiation property improves more.

According to the optical scanner 1 of this embodiment, because thermal deformation of the mirror holding member 7C holding the light guide mirror 56 and deviation of the position of the light guide mirror 56 caused by the thermal deformation can be prevented, the light reflected by the light guide mirror 56 can be allowed to enter the light receiving element 61 properly. As a result, the image write start position on the photosensitive drum 121 can be controlled properly, and a high-quality image with less image deviation can be provided.

Note that this embodiment has described an example for applying the present invention to the printer 100 as an image forming apparatus, but the present invention can be applied to a copier or a facsimile as well.

Further, in this embodiment the present invention is applied to the mirror holding member 7C (7M) for holding the light guide mirror 56 of the optical scanner 1, but the present invention can be applied to a holding member that holds other mirrors as well. For example, the present invention can be applied to a holding member for holding the reflecting mirror that guides the light reflected by the polygon mirror 3 to the photosensitive drum (target object) 121. The mirror holding member 54C, which is disposed on the right-hand side in the housing 2 and holds the reflecting mirror (mirror member) 54, may be configured as shown in FIGS. 8 and 9. Note that the mirror holding member 54C corresponds to the cyan unit 12C.

The mirror holding member 54C shown in FIGS. 8 and 9 has a holding part 540 for holding the reflecting mirror 54, and a fin (heat radiation fin; heat radiation part) 72A provided consecutively with the holding part 540. The through-hole 23a corresponding to the mirror holding member 54C is provided in the right wall surface 23 of the housing 2.

In the mirror holding member 54C, the holding part 540 is inserted into the through-hole 23a when the reflecting mirror 54 held by the holding part 540 is positioned inside the housing 2. The fin 72A is configured by four of the plate materials 7200 that extend horizontally and are arranged vertically with a predetermined space therebetween. When the holding part 540 is inserted into the through-hole 23a, the fin 72A protrudes from the right wall surface 23 of the housing 2 to the right-hand side and is exposed to the outside of the housing 2, as shown in FIGS. 8 and 9.

By configuring the mirror holding member 54C in this manner, the following operations and effects are achieved. Specifically, an excessive increase in the temperature of the holding part 540 is prevented by the air-cooling and heat radiation operation performed by the fin 72A exposed to the outside of the housing 2. Therefore, thermal deformation of the mirror holding member 54C caused by the increase in the temperature of the mirror holding member 54C, and deviation of the position of the reflecting mirror 54 caused by the thermal deformation can be prevented, suppressing deviation of the optical path of the reflected light that is caused by the deviation of the position of the reflecting mirror 54. As a result, the reflected light can scan on the photosensitive drum 121 properly, and a high-quality image with less image deviation can be provided. Note that the abovementioned configuration can be applied to the mirror holding member that holds each of the reflecting mirrors (mirror member) 53 and 55, as well as to the mirror holding member that is provided corresponding to the magenta unit 12M and holds each of the reflecting mirror (mirror member) 53 to 55.

This embodiment has described the mirror holding member 7C (7M) in which the fin 72 is provided consecutively with the holding part 71 holding the light guide mirror 56, and the mirror holding member 54C (54M) in which the fin 72A is provided consecutively with the holding part 540 holding the reflecting mirror 54. However, this embodiment is not limited to this example. For example, a configuration is possible in which another fin 72 is attached, as a heat radiation part, to a conventional member for holding a mirror.

Figure 10:
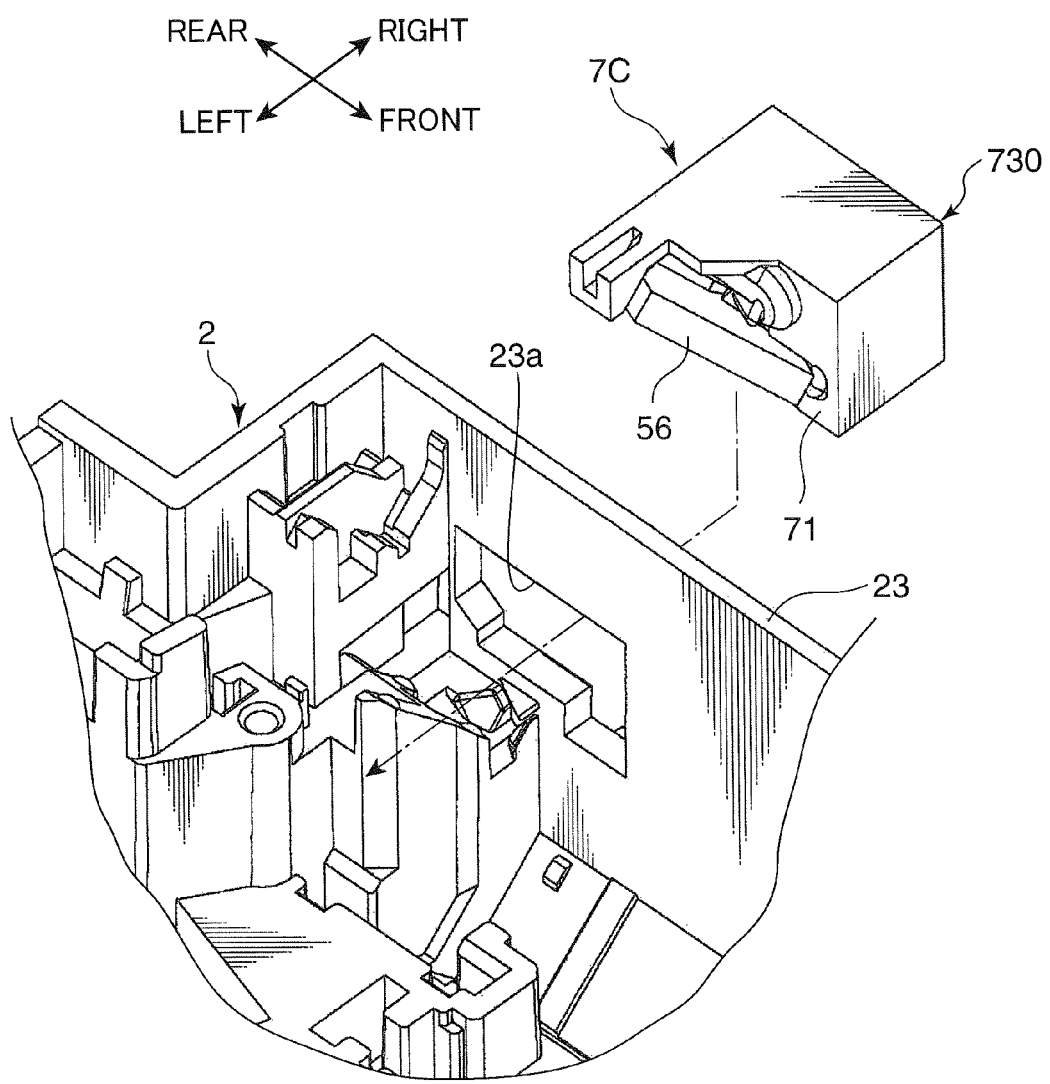
FIG. 10 is a perspective view for illustrating another configuration of the mirror holding member for holding the light guide mirror.
Figure 11:
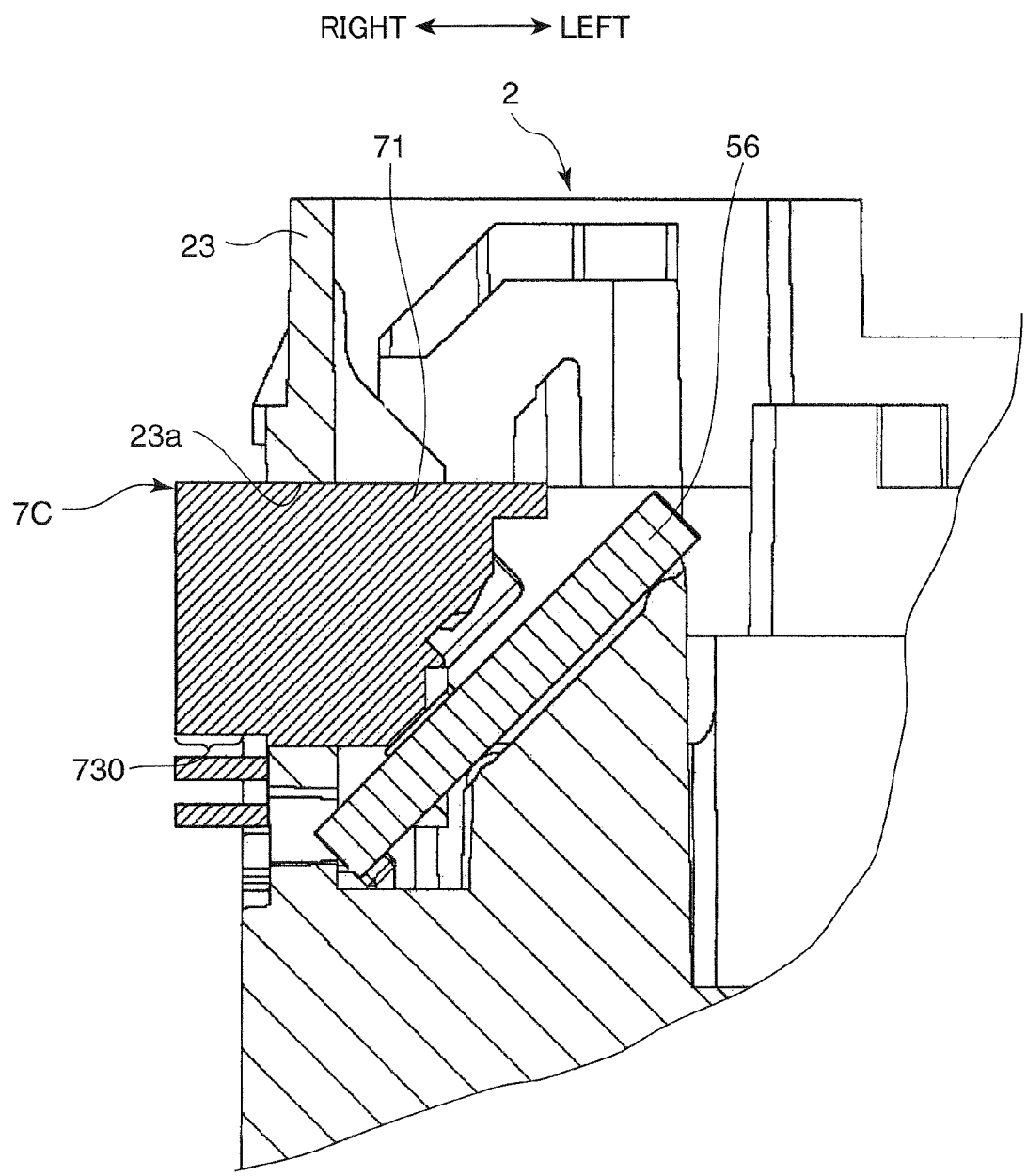
FIG. 11 is a cross-sectional diagram for illustrating another configuration of the mirror holding member for holding the light guide mirror.

Further, this embodiment has described an example in which air-cooling and heat radiation is performed by the fin 72, but a configuration is possible in which heat radiation is performed by a heat radiation part that has a different shape from the fin. Also, a part of the mirror holding member 7C (7M) may be exposed to the outside of the housing 2 to obtain the heat radiation operation. FIGS. 10 and 11 show an example of a configuration in which a part of the mirror holding member 7C is exposed to the outside of the housing 2 to obtain the heat radiation operation.

In FIGS. 10 and 11, the heat radiation part is configured by a part of the holding part 71 that holds the light guide mirror 56. Specifically, as shown in FIG. 11, when the holding part 71 is inserted into the through-hole 23a, the part of the holding part 71 forms an exposed section 730 that is exposed to the outside of the housing 2. In this manner, the exposed section 730 that is exposed to the outside of the housing 2 configures the heat radiation part. Even when the radiation part is configured by the exposed section 730 exposed to the outside of the housing, the heat transmitted to the holding part 71 is released to the outside of the housing 2 through the exposed section 730.

Thus, the excessive increase in the temperature of the mirror holding member 7C can be prevented. Consequently, thermal deformation of the mirror holding member 7C caused by the increase in the temperature of the mirror holding member 7C and deviation of the position of the light guide mirror 56 caused by the thermal deformation can be prevented. As described above, the configuration in which a part of the mirror holding member is exposed to the outside of the housing 2 to obtain the heat radiation operation can also be applied to the mirror holding member 7M corresponding to the magenta unit 12M and the mirror holding member holding each of the reflecting mirrors 53 to 55.

In the configuration of the concrete embodiment described above, it is desired that the mirror holding member have the holding part that holds the mirror holding member and is inserted into the through-hole, and that the heat radiation part be provided consecutively with the holding part.

According to this configuration, because the heat radiation part provided consecutively with the holding part holding the mirror member is exposed to the outside of the housing, the heat of the holding part is transmitted to the heat radiation part efficiently and emitted to the outside of the housing by the heat radiation part. Therefore, thermal deformation of the holding part and deviation of the position of the mirror member that is caused by the thermal deformation can be prevented sufficiently.

According to the configuration described above, it is desired that the heat radiation part be configured by a heat radiation fin.

According to this configuration, the radiation property improves more by providing a heat radiation fin that has a larger surface area than a simple convex heat radiation part.

In the configuration described above, it is desired that the mirror holding member be attached such that it protrudes to the outside of the housing through the through-hole, and that the heat radiation part be configured by a section of the mirror holding member that protrudes to the outside of the housing.

According to this configuration, the heat that is transmitted to the mirror holding member is released to the outside of the housing via the section cooler than the inside of the housing and protruding to the outside of the housing. Therefore, the heat radiation property can be secured in the mirror holding member without adding a configuration for releasing the heat transmitted to the mirror holding member to the outside of the housing. Consequently, labor and costs required for securing the heat radiation property of the mirror holding member can be suppressed.

In the configuration described above, it is desired that a light receiving element on the base for controlling a write start position of the image on the object to be scanned is provided inside the housing as the target object, that the optical scanning unit be configured to guide the light to the light receiving element, and that the mirror member be the light guide mirror for reflecting the light reflected by the polygon mirror, toward the light receiving element.

According to this configuration, the heat of the mirror holding member is released to the outside of the housing by the heat radiation part provided in the mirror holding member for holding the light guide mirror. Therefore, thermal deformation of the mirror holding member holding the light guide mirror and deviation of the position of the light guide mirror caused by the thermal deformation can be prevented, so that the light reflected by the light guide mirror can enter the light receiving element properly. As a result, the image write start position on the object to be scanned can be controlled appropriately, and a high-quality image with less image deviation can be provided.

In the configuration described above, it is desired that the target object be the object to be scanned, and that the mirror member be the reflecting mirror that reflects the light reflected by the polygon mirror, toward the object to be scanned.

According to this configuration, the heat of the mirror holding member is released to the outside of the housing by the heat radiation part provided in the mirror holding member holding the reflecting mirror. Therefore, thermal deformation of the mirror holding member holding the reflecting mirror, and deviation of the position of the reflecting mirror caused by the thermal deformation can be prevented, so that the light reflected by the reflecting mirror can properly enter the object to be scanned. As a result, the reflected light can properly scan on the object to be scanned, and a high-quality image with less image deviation can be provided.

This application is based on Japanese Patent application serial No. 2008-211961 filed in Japan Patent Office on Aug. 20, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical scanner for an image forming apparatus, comprising:
    a housing having a wall surface provided with a through-hole; and
    an optical scanning unit, which is provided within the housing, scans light on an object to be scanned in order to form an image on the object to be scanned, and includes:
    a polygon motor;
    a polygon mirror that reflects the light while being rotated by a driving force of the polygon motor;
    a mirror member that reflects the light reflected by the polygon mirror, toward a target object; and
    a mirror holding member that is attached to the wall surface of the housing and holds the mirror member,
    wherein the mirror holding member has a heat radiation part that is exposed to the outside of the housing through the through-hole.

2. The optical scanner for an image forming apparatus according to claim 1, wherein the mirror holding member has a holding part that holds the mirror member and is inserted into the through-hole, and the heat radiation part is provided consecutively with the holding part.

3. The optical scanner for an image forming apparatus according to claim 1, wherein the heat radiation part is configured by a heat radiation fin.

4. The optical scanner for an image forming apparatus according to claim 1, wherein the mirror holding member is attached such that the mirror holding member protrudes to the outside of the housing through the through-hole, and the heat radiation part is configured by a section of the mirror holding member that protrudes to the outside of the housing.

5. The optical scanner for an image forming apparatus according to claim 1, further comprising:
   a light receiving element on a base for controlling a write start position of the image on the object to be scanned, the light receiving element being provided inside the housing as the target object,
   wherein the optical scanning unit is configured to guide the light to the light receiving element, and the mirror member is a light guide mirror for reflecting the light reflected by the polygon mirror, toward the light receiving element.

6. The optical scanner for an image forming apparatus according to claim 1, wherein the target object is the object to be scanned, and the mirror member is a reflecting mirror for reflecting the light reflected by the polygon mirror, toward the object to be scanned.

* * * * *